(12) United States Patent
Yamanaka et al.

(10) Patent No.: US 8,926,471 B2
(45) Date of Patent: Jan. 6, 2015

(54) DIFFERENTIAL DEVICE

(71) Applicant: GKN Driveline Japan Ltd, Tochigi (JP)

(72) Inventors: Yasuo Yamanaka, Oyama (JP); Atsushi Maruyama, Utsunomiya (JP)

(73) Assignee: GKN Driveline Japan Ltd, Tochigi (JP)

(*) Notice: Subject to any disclaimer, the term of this patent is extended or adjusted under 35 U.S.C. 154(b) by 0 days.

(21) Appl. No.: 13/928,259

(22) Filed: Jun. 26, 2013

(65) Prior Publication Data
US 2014/0004988 A1 Jan. 2, 2014

(30) Foreign Application Priority Data
Jun. 29, 2012 (JP) .................................. 2012-146628

(51) Int. Cl.
| | |
|---|---|
| *F16H 57/08* | (2006.01) |
| *F16H 48/22* | (2006.01) |
| *F16H 48/24* | (2006.01) |
| *F16H 48/08* | (2006.01) |
| *F16H 48/34* | (2012.01) |

(52) U.S. Cl.
CPC ............... *F16H 48/22* (2013.01); *F16H 48/24* (2013.01); *F16H 48/08* (2013.01); *F16H 2048/346* (2013.01)

USPC .......................................... 475/331; 74/606 R

(58) Field of Classification Search
USPC .......................................... 475/331; 74/606 R
See application file for complete search history.

(56) References Cited

U.S. PATENT DOCUMENTS

| | | |
|---|---|---|
| 8,348,799 B2 | 1/2013 | Maruyama et al. |
| 2007/0197338 A1* | 8/2007 | Fusegi .......................... 475/231 |
| 2010/0056314 A1* | 3/2010 | Maruyama et al. ........... 475/150 |

\* cited by examiner

*Primary Examiner* — Derek D Knight
(74) *Attorney, Agent, or Firm* — Bejin Bieneman PLC

(57) ABSTRACT

A differential device is comprised of a casing with a first end wall and a side wall forming a corner with the first end wall; a differential gear set including an input gear and first and second side gears that are so meshed with the input gear to allow differential motion between the first and second side gears; and a clutch member being housed in and axially movable in the casing from a first position where the clutch member engages with the first side gear to limit the differential motion to a second position where the clutch member rests on the first end wall and frees the first side gear, the clutch member slidably fitting on the first side gear so as to keep the clutch member concentric with the first side gear.

8 Claims, 3 Drawing Sheets

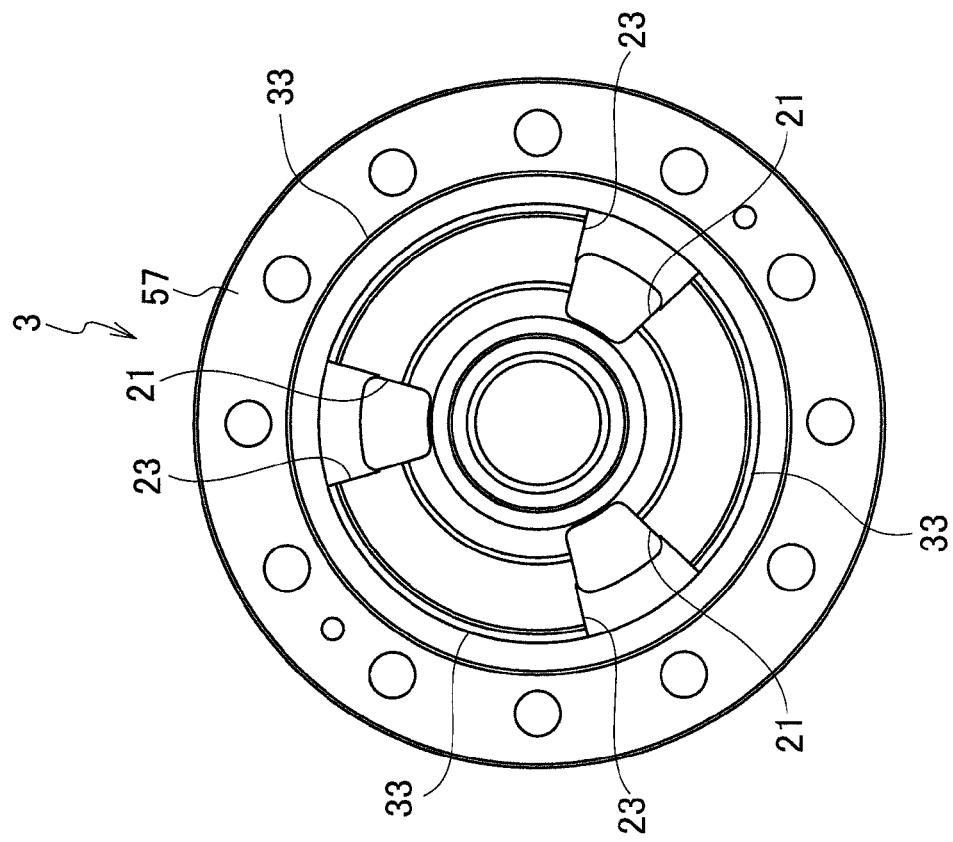
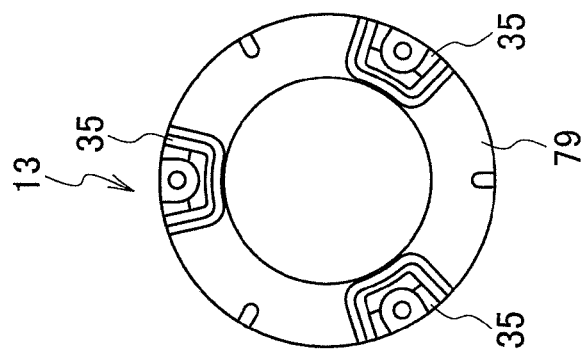
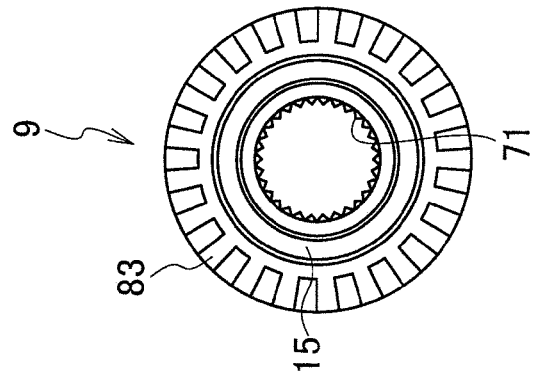

DIFFERENTIAL DEVICE

CROSS-REFERENCE TO RELATED APPLICATIONS

This application is based upon and claims the benefit of priority from the prior Japanese Patent Application No. 2012-146628 (filed Jun. 29, 2012); the entire contents of which are incorporated herein by reference.

BACKGROUND OF THE INVENTION

1. Field of the Invention

The present invention relates to a differential device having a differential gear set and a clutch therein.

2. Description of the Related Art

As is known, an automobile is equipped with a differential device, which distributes a driving force of an engine and/or an electric motor to right and left output axles with allowing differential motion between these axles. Some differential devices, such as "locking differential" or "lock-up differential" for example, have clutches built therein, for the purpose of limiting differential motion between the right and left axles so as not to lose traction with the road particularly when one of the wheels loses contact with the road.

In a design for a lock-up differential, one of side gears has clutch teeth and a clutch member for meshing with these clutch teeth is axially movably disposed in a differential casing. As the clutch member is forced to follow the rotation of the differential casing, when these clutch teeth mesh together, differential motion is locked. U.S. Pat. No. 8,348,799 discloses a related art.

SUMMARY OF THE INVENTION

The casing in the aforementioned related art must have an axially straight internal face to guide the axial movement of the clutch member. This portion of the casing inevitably forms an angular corner with respect to an end wall of the casing. The present inventors found out that this angular corner gives rise to stress concentration. If increased thickness was given to the portion in question, this problem could be solved. This solution is, however, contrary to the constant need for downsizing.

The present invention has been achieved in view of the aforementioned problems. According to an aspect of the present invention, a differential device having an axis is comprised of a casing rotatable about the axis, the casing including a first end wall rising from the axis and a side wall forming a corner with the first end wall; a differential gear set being housed in and drivingly coupled with the casing and including an input gear and first and second side gears rotatable about the axis, the first and second side gears being so meshed with the input gear to allow differential motion between the first and second side gears; and a clutch member being housed in and axially movable in the casing from a first position where the clutch member engages with the first side gear to limit the differential motion to a second position where the clutch member rests on the first end wall and frees the first side gear, the clutch member slidably fitting on the first side gear so as to keep the clutch member concentric with the first side gear.

BRIEF DESCRIPTION OF THE DRAWINGS

FIG. 3A is a side view of the side gear.

FIG. 3B is a side view of the clutch member.

FIG. 3C is a side view of the casing main body.

DETAILED DESCRIPTION OF THE PREFERRED EMBODIMENT

Certain embodiments of the present invention will be described hereinafter with reference to the appended drawings.

Figure 1:
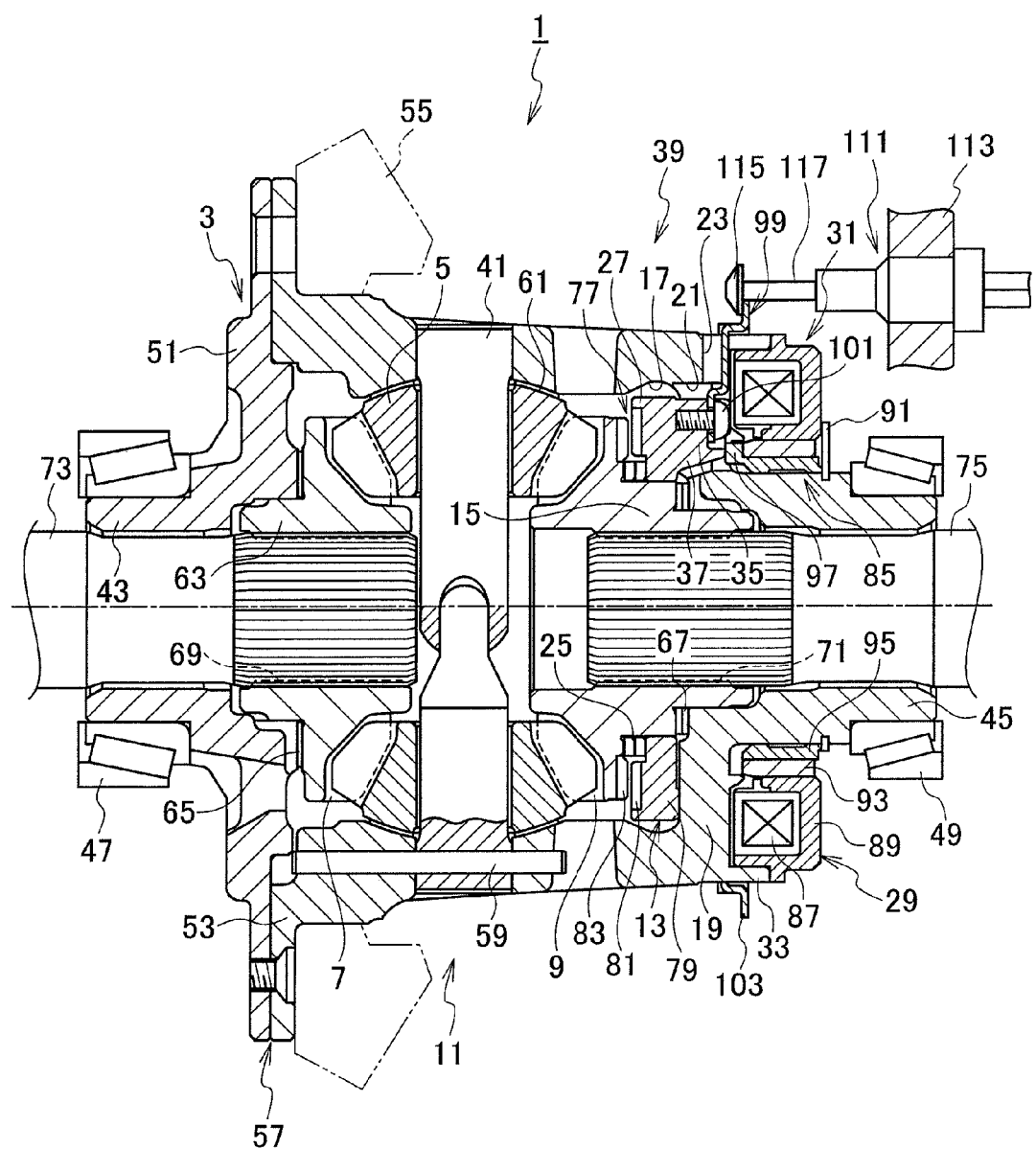
FIG. 1 is a cross sectional view of a differential device of an embodiment of the present invention.

A lock-up differential device 1 of a bevel gear type shown in FIG. 1 will be exemplified to describe an embodiment of the present invention, whereas the present invention may be embodied in various types of differential devices.

The differential device 1 is comprised of a casing 3 rotatable about an axis (shown by a chain line), and a differential gear set 11 with pinions (input gears) 5 and left and right side gears 7, 9 housed in and drivingly coupled with the casing 3. The casing 3 receives torque from an engine and/or an electric motor. The side gears 7, 9 are respectively drivingly coupled with left and right axles 73, 75. As the differential gear set 11 allows differential motion between the left and right side gears 7, 9, the torque of the engine/motor is distributed to both the axles 73, 75 without losing traction.

The lock-up differential device 1, as with one of the prior art, is comprised of a clutch member 13 for limiting the differential motion. The clutch member 13 is made movable in the axial direction within the casing 3 so as to engage with and disengage from one of the side gears, namely the right side gear 9 in this example, thereby switching the differential device 1 between a lock-up mode and a differential mode.

The clutch member 13 slidably fits on the right side gear 9 so that the right side gear 9, instead of an internal face of the casing 3, guides the clutch member 13 and keeps the clutch member 13 concentric with the right side gear 9. The casing 3 does not have to have a guiding internal face and can be therefore freely designed to avoid stress concentration. An internal face of a corner part between a right end wall and a side wall may be comprised of a rounded dent 17 for example. Rounded shapes such as the rounded dent 17 may relieve stress concentration.

More detailed descriptions will be given hereinafter.

Referring to FIG. 1, the whole of the differential device 1 is rotatably housed in a carrier 113 that is a stationary member relative to the vehicle. The casing 3 is comprised of paired boss portions 43, 45 axially projecting outward, which are used for rotatable support by the carrier 113. Thereby the casing 3 is rotatable about its axis. For smooth support and suppressing frictional loss, ball bearings or roller bearings 47, 49 may be interposed.

The casing 3 is comprised of a flange portion 57 and is preferably dividable there into two parts 51, 53. The parts 51, 53 along with a ring gear 55 are secured together by means of plural bolts and nuts so that torque input from an engine/motor to the ring gear makes the casing 3 as a whole to rotate about the axis.

Figure 2:
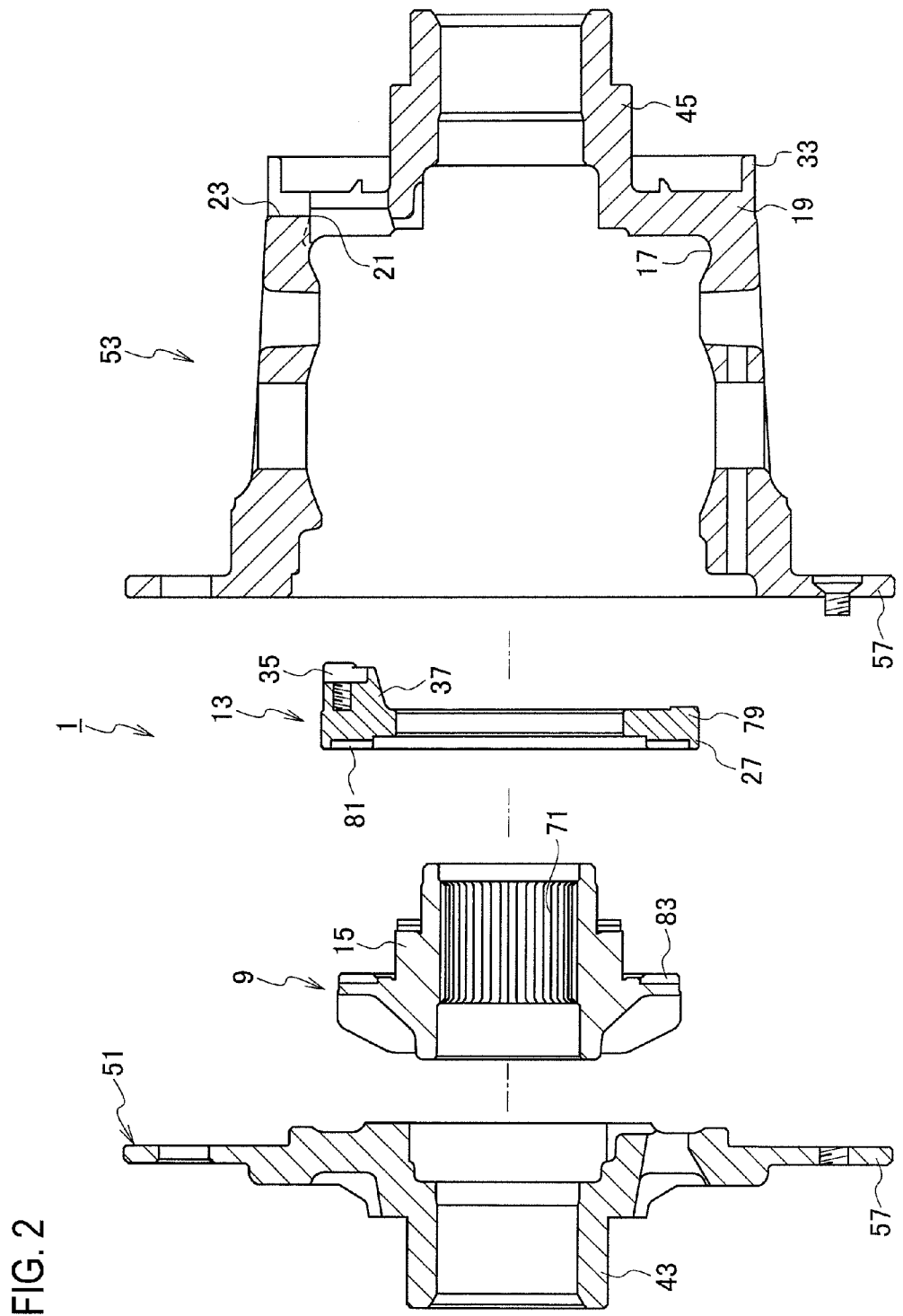
FIG. 2 is an exploded cross sectional view of the differential device, which only shows a casing main body, a clutch member, a side gear, and a cover.

This dividable configuration allows installation of internal members into the casing 3. Referring to FIG. 2, internal members such as the pinions 7, the side gears 7, 9, and the clutch member 13 are inserted through the opening of the main part 53 opened when the covering part 51 is detached therefrom.

Referring again to FIG. 1, the main part 53 of the casing 3 is in general comprised of the boss portion 45, an end wall 19 rising from the boss portion 45, and a side wall generally parallel to its axis. These portions are preferably formed in a unitary body. The end wall 19 and the side wall define a cavity for housing the internal members.

The end wall 19 and the side wall form a corner generally at right angle. The internal periphery of the corner is formed in a rounded shape, which is so structured as to relieve stress concentration there. The rounded internal periphery may be formed as the rounded dent 17 receding from an outer periphery of the clutch member 13 to some degree. The rounded dent 17 may be formed to have a radius of R=5 mm but may be properly rounded in light of stress relief.

Referring to FIG. 3C in combination with FIG. 1, the end wall 19 is comprised of windows 21 for allowing access from the exterior into the interior. The windows 21 may be formed to penetrate the casing 3 in the axial direction and communicate with the rounded dent 17.

In addition, the windows 21 may respectively have portions directed radially outward, which will be referred to as radial through holes 23. Outer ends 103 of a detector 99 described later are led out through the radial through holes 23. The radial through holes 23 may not directly but via the windows 21 communicate with the rounded dent 17.

The pinions 7 are respectively supported by pinion shafts 41 inserted through bores on the side wall of the main part 53 and are respectively secured by pins 59 inserted in directions of traverse. The number of the pinions 7 may be arbitrarily determined but may be four as an example.

The pinion shafts 41 allow rotation of the pinions 7 thereabout. To assure smooth rotation and receive thrust force on the pinions 7, each pinion 7 may have a spherical washer 61 interposed between the pinion 7 and the casing 3.

The pair of side gears 7, 9 is so disposed in the casing 3 as to mesh with the pinions 7. The side gears 7, 9 respectively have boss portions 63, 15 axially projecting, which are respectively rotatably supported by the casing 3, and further have splined internal peripheries 69, 71 for the purpose of coupling with the left and right axles 73, 75, respectively. To assure smooth rotation and receive thrust force on the side gears 7, 9, each side gear 7, 9 may have a thrust washer 65, 67 interposed between the side gear 7, 9 and the casing 3.

The pinions 7, when meshing with the side gears 7, 9, form the differential gear set 11 to allow differential motion between, and distribute input torque to, the side gears 7, 9, and as well the left and right axles 73, 75.

Referring to FIG. 3B in combination with FIG. 1, the clutch member 13 housed in the casing 3 is comprised of a base part 79 formed in a ring shape and is so disposed as to face the right side gear 9. An internal periphery of the base part 79 slidably fits on the outer periphery of the boss portion 15 of the side gear 9. The clutch member 13 is thereby made movable in the axial direction and also kept concentric with the side gear 9 without guidance by the internal periphery of the casing 3. More specifically, the differential device 1 requires no means for bringing the clutch member 13 into axial alignment, excepting the boss portion 15 of the side gear 9.

On the base part 79 formed are clutch teeth 81 projecting toward the side gear 9 and, referring to FIG. 3A in combination, the side gear 9 is correspondingly comprised of clutch teeth 83. The combination of the clutch member 13 and the side gear 9 forms a locking means for locking up the differential gear set 11. The combination of the clutch teeth 81 and the clutch teeth 83 forms a clutch 77 for the locking means 39.

The clutch member 13 may be further comprised of a reinforcement part 27 axially standing around its outer periphery. As the reinforcement part 27 connects the clutch teeth 81 as a unitary body, not only the clutch teeth 81 but also the clutch member 13 as a whole are reinforced and stiffened.

On another side of the base part 79 formed are engaging projections 35. The windows 21 on its end wall 19 are so formed as to respectively catch the engaging projections 35, thereby making the clutch member 13 anti-rotated relative to the casing 3. Thus, when the locking means 39 is in mesh, the side gear 9 is restricted to rotate with the casing 3 and therefore the differential motion is disabled.

Both or either of the engaging projections 35 and the windows 21 may be formed in a slope shape so as to form a cam that partially converts torque of the rotating casing 3 into axial force for assisting the locking means 39 to keep its meshing state.

Each of the engaging projections 35 may be further comprised of a slope 37 that makes the thickness of the projection 35 gradually greater toward the base part 79. The slopes 37 of the projections 35 reinforce and stiffen the projections 35.

To urge the clutch member 13 to depart from the side gear 9, a repulsive member 25 such as a coil spring may be interposed between the clutch member 13 and the side gear 9. In the absence of force exerted by an actuator 31 described below, the clutch member 13 rests on the end wall 19 and frees the side gear 9.

The actuator 31 is provided to actuate the clutch member 13 toward the side gear 9. An actuator with a solenoid is exemplified in the following description although any other type of an actuator such as a hydraulic device, a pneumatic device, or any mechanical device may be applied thereto.

The actuator 31 is comprised of a solenoid 29 and a moving part 85 actuated by the solenoid 29 to move the clutch member 13.

The solenoid 29 is comprised of a coil 87 and a core 89 for conducting magnetic flux generated by the coil 87. The solenoid 29 is disposed to be coaxial with the axis of the casing 3 and abuts on the end wall 19 of the casing 3. The boss portion 45 may have a stepped cylindrical portion on which the solenoid 29 rests. A member 91 standing on the boss portion 45 keeps the solenoid 29 in place.

The coil 87 is comprised of a conductor wire wound in a circular shape and molded with proper resin. Both ends of the wire are led out of the solenoid 29 and connected with lead wires that are led to a battery via a controller (not shown). Under control by the controller, the solenoid 29 is excited.

The core 89 is made anti-rotated by any member secured to a stationary member of the vehicle body. The core 89 alone, or in combination with the end wall 19, nearly thoroughly encloses the coil 87 but leaves a gap at the internal side thereof. The moving part 85 is so disposed as to face this gap so that the magnetic flux leaping over this gap drives the moving part 85. Either the end wall 19 or the core 89 may be comprised of an elongated portion 33 so as to ensure combination therebetween.

The moving part 85 is formed in a ring shape and fits within the inner periphery of the solenoid 29. The moving part 85 may be comprised of a plunger 93 of a magnetic material and a ring member 95 of a non-magnetic material, which are drivingly coupled together. The plunger 93 receives magnetic force to allow the solenoid 29 to actuate the moving part 85. The ring member 95 prevents leakage of the magnetic flux to the casing 3. Thus this combination improves energy efficiency. The member 91 prevents dislocation of the moving part 85 out of the actuator 31.

The ring member 95 is elongated toward the clutch member 13 to form pressure portions 97 that respectively get into contact with the engaging projections 35 through the windows 21. The pressure portions 97, when the ring member 95 is actuated by the solenoid 29, press the engaging projections 35 of the clutch member 13 to let the locking means 39 into the meshing state.

The moving part 85 may be, nevertheless, omitted. In such modified embodiments, the solenoid 29 may be configured to be movable by itself toward the side gear 9 to actuate the clutch member 13. To mediate driving force of the solenoid 29, any intervening member such as a needle bearing or a thrust washer may be used.

The differential device 1 may be further comprised of the detector 99 for detecting position of the clutch member 13. The detector 99 may be formed in a strip-shape or a flange shape having the outer ends 103 and inner ends. The outer ends 103 are led out of the casing 3 through the radial through holes 23 and the inner ends are secured to the clutch member 13 by means of screws 101 or such. If any external sensor or switch is coupled with the outer ends 103, the sensor or switch follows motion of the clutch member 13, thereby the sensor or switch can detect whether the clutch 77 is in a meshing state or not.

The differential device 1 may be further comprised of a switch 111 for detecting the position of the clutch member 13. The switch 111 may be secured to the carrier 113 or any other stationary member. The switch 111 is comprised of an elongated knob 117 and an engaging flange 115 at an end thereof, which is so formed as to engage with the detector 99. When the clutch member 13 moves, the detector 99 follows its motion and accordingly pulls the knob 117, thereby switching the switch 111 on or off. Thus the state of the clutch 77 can be electrically detected. A narrow gap may be held between the engaging flange 115 and the detector 99, when the clutch member 13 rests on the end wall 19. This is advantageous in avoiding frictional energy loss therebetween. Further the knob 117 may be structured to be rotational. This is advantageous in reducing energy loss even after the clutch member 13 moves toward the side gear 9 and thereby the detector 99 is forced to butt against the engaging flange 115.

As the locking means 39 by itself brings the clutch member 13 and the side gear 9 into axial alignment, the casing 3 is not required to have a straight internal face to guide the clutch member 13. Freedom of design about the casing 3 is therefore improved. The casing 3 can be consequently comprised of a structure for relieving stress concentration, such as the rounded dent 17. Of course, any structure such as a rounded corner or an oblique corner may be used instead. The present embodiment can respond to the constant need for downsizing although strength of the structure will not be vitiated.

In addition, the rounded dent 17 functions as an oil reservoir. Further the windows 21 and the through holes 23 communicating with the rounded dent 17 promote oil circulation to the exterior. Centrifugal force assists this oil circulation. Therefore the present embodiment is further advantageous in light of lubrication quality.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A differential device having an axis, the differential device comprising:
   a casing rotatable about the axis, the casing including a first end wall rising from the axis and a side wall forming a corner with the first end wall;
   a differential gear set being housed in and drivingly coupled with the casing and including an input gear and first and second side gears rotatable about the axis, the first and second side gears being so meshed with the input gear to allow differential motion between the first and second side gears; and
   a clutch member being housed in and axially movable in the casing from a first position where the clutch member engages with the first side gear to limit the differential motion to a second position where the clutch member rests on the first end wall and frees the first side gear, the clutch member slidably fitting on the first side gear so as to keep the clutch member concentric with the first side gear; wherein an internal periphery of the corner is recessed to prevent support of an outer periphery of the clutch member by the casing.

2. The differential device of claim 1, comprising:
   no means for bringing the clutch member into axial alignment, excepting the first side gear fitting in the clutch member.

3. The differential device of claim 1, wherein:
   the recess is a rounded dent on the internal periphery of the corner, the dent receding from the outer periphery of the clutch member.

4. The differential device of claim 3, further comprising:
   an axial through hole axially penetrating the first end wall to communicate with the dent; and
   a radial through hole radially penetrating the side wall to, not directly but via the axial through hole, communicate with the dent.

5. The differential device of claim 1, further comprising:
   a repulsive member configured to urge the clutch member toward the second position, the repulsive member being put between the clutch member and the first side gear.

6. The differential device of claim 1, wherein the clutch member includes a reinforcement part axially standing around an outer periphery of the clutch member.

7. The differential device of claim 1, further comprising:
   an actuator including a moving part so disposed as to come in contact with the clutch member and a solenoid configured to drive the moving part; and
   an elongated portion formed on the casing and so structured as to ensure combination between the casing and the solenoid.

8. The differential device of claim 1, wherein the clutch member includes a base part, a projection projecting from the base part and engaging with the casing, the projection including a slope making a thickness of the projection greater toward the base part.

\* \* \* \* \*